Jan. 5, 1965 C. G. TOLSON 3,164,145
AIR HEATING APPARATUS
Filed July 9, 1962
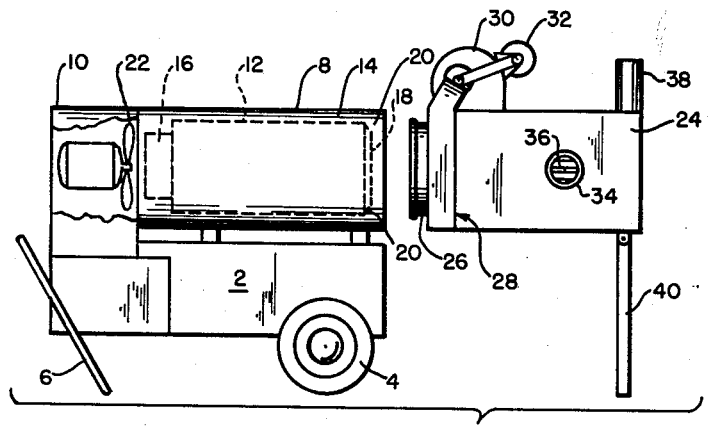
FIG. 1
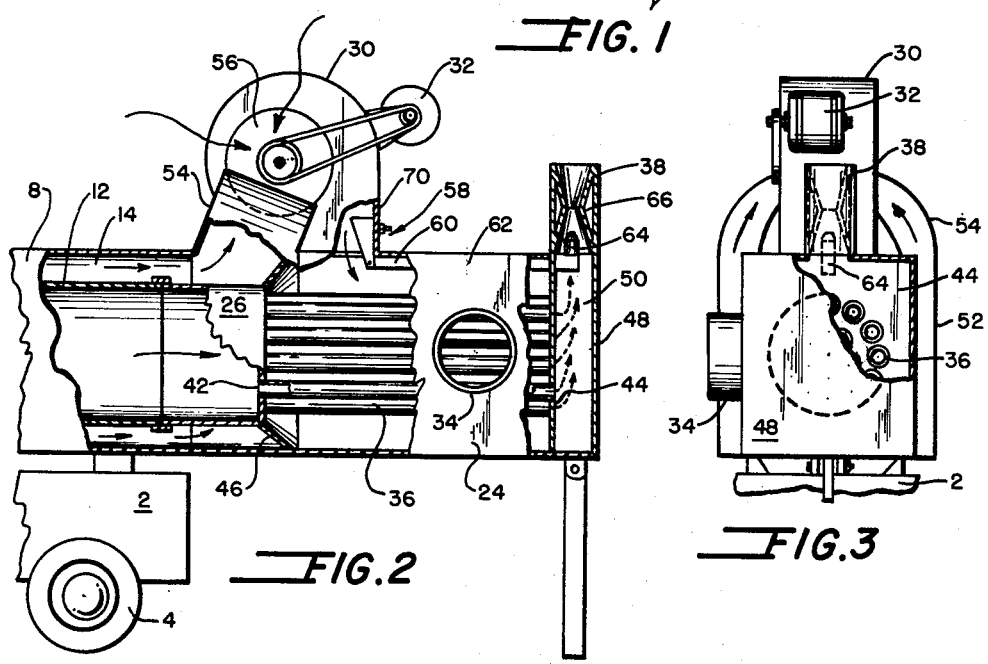
FIG. 2
FIG. 3
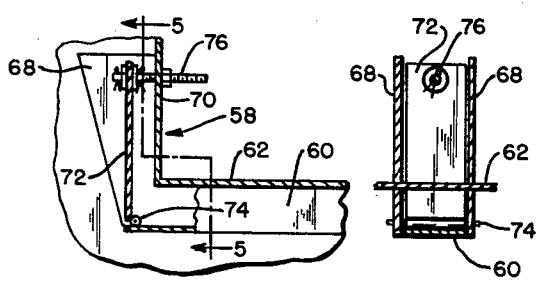
FIG. 4   FIG. 5
INVENTOR.
CHARLES G. TOLSON
BY
ATTORNEY United States Patent Office 3,164,145
Patented Jan. 5, 1965

3,164,145
AIR HEATING APPARATUS
Charles G. Tolson, Rock Island, Ill., assignor to American Air Filter Company, Inc., Louisville, Ky., a corporation of Delaware
Filed July 9, 1962, Ser. No. 208,378
6 Claims. (Cl. 126—110)

This invention relates to air heating apparatus and in particular to apparatus attachable to a direct-fired air heater for converting it from direct-fired to indirect-fired operation.

One salient difference between a direct-fired and an indirect-fired operation is that in the former the products of combustion mix with contaminate the air used for heating, while in the latter the products of combustion do not mix with this air. In the portable space heater field both types are rather widely used, with the selection of the particular type normally being dictated by considerations of whether contaminated air is permissible in the heated space. With both the initial and the operating cost of the direct-fired heater being significantly less, it is selected whenever possible. However, frequently it would be desirable to be able to use a heater in either a direct-fired or indirect-fired operation in accordance with the requirements of the space to be heated. Because of various considerations, convertibility of operation is believed most advantageously obtained if a direct-fired heater is provided as a base unit, operable alone if desired, and an attachment for converting operation to indirect-fired is furnished as a separate auxiliary unit.

Thus an object of the present invention is the provision of apparatus which may be attached to a direct-fired heater to obtain operation of indirect-fired character.

A further object is the provision of such apparatus so arranged that attendant air flow and other problems encountered in such an arrangement are solved in a simple, effective manner.

Some of the problems solved by the present invention will perhaps be more readily understood if the structural character of a conventional forced air, direct-fired, portable heater is first outlined. Such a heater typically includes: a cylindrical outer casing defining an air passage for the flow of air to be heated; a somewhat shorter, and diametrically smaller, inner cylindrical drum serving as a combustion chamber, the drum being open in part on each end to admit fuel and air into its inlet end, and to discharge combustion gases from its outlet end for mixing with uncontaminated air which flows through the annular space formed between the drum and the casing; a burner structure on the inlet end of the drum, including a fuel nozzle, ignition electrodes, and apertures for the admission of combustion air into the drum; and fan means at the inlet end of the outer casing for forcing combustion air into the drum and ventilating air through the annular space between the drum and casing. The outlet end of the drum normally has a diffuser thereon to confine combustion to the drum, and the combustion gases leave the drum through the peripheral gap thus formed between the diffuser and drum. While the diffuser exerts some resistance to the flow of air, the provision on the outlet end of the heater of auxiliary heat exchanger apparatus having satisfactory heat exchanging characteristics exerts appreciably greater resistance. The resistance change adversely affects the design fuel-to-air ratio of the heater proper, and it is to the solution of this problem that the invention is in part directed.

In its simplest form, the invention may be characterized as an auxiliary heat exhcanger attached to the outlet end of a direct-fired air heater and connected thereto so that the combustion gases pass through both the heater and auxiliary heat exchanger separately from the ventilating air. The invention is also concerned in part with the provision of a structural arrangement for handling the ventilating air flow in a manner which does not interfere with the design ratio of ventilating air to combustion air flow in the heater and which also effectively utilizes this ventilating air in the auxiliary heat exchanger section.

In accordance with the invention, the auxiliary heat exchanger is connected to receive into its inlet the combustion gases from the combustion drum of the air heater proper and convey them to a combustion gas outlet; the ventilating air from the annular passage of the heater is diverted to the inlet to separate blower means which also takes ambient air into its inlet and forces the combined air in heat exchanging relation past the auxiliary heat exchanger; and means for directing a portion of the air discharged from the separate blower means to a venturi section in the combustion gas stack. The latter arrangement produces a draft in the stack which compensates for the increased resistance to the flow of combustion gas arising from the attachment of the auxiliary heat exchanger apparatus.

A preferred embodiment of the invention by way of example is illustrated in the accompanying drawing wherein:

FIGURE 1 is a side view of a direct-fired portable heater and the conversion apparatus in separated relation;

FIGURE 2 is a fragmentary side view, broken in part and enlarged relative to FIGURE 1, showing the heater and conversion apparatus in coupled relation;

FIGURE 3 is a fragmentary partly broken end view of the apparatus of FIGURE 2;

FIGURE 4 is a fragmentary, partly broken detail view of the air takeoff arrangement associated with the separate blower means of the converstion apparatus; and, FIGURE 5 is a sectional view corresponding to one taken along the line 5—5 of FIGURE 4.

The forced draft heater of the direct-fired type shown at the left in FIGURE 1 generally comprises: a base portion 2 which also serves as a fuel tank and is normally supported in a horizontal position by a pair of wheels 4 and a handle 6; an outer cylindrical casing 8, open at both ends, and mounted upon the base 2; a motor-fan assembly cowl 10 of generally semi-cylindrical shape connected to the upstream end of the cylindrical casing 8; a cylindrical combustion chamber or drum 12 of shorter length and lesser diameter than outer casing 8 and co-axially disposed within the casing to form an annular passage 14 between the circumferential walls of the casing and the drum; a burner shell 16 mounted on the upstream end of the combustion drum 12 and supporting a fuel nozzle and ignition electrodes (not shown), the shell also including openings to admit combustion air into the drum 12; a diffuser plate 18 of lesser diameter than the combustion drum co-axially positioned on the downstream end of the drum and forming therewith a peripheral gap or outlet 20 through which combustion gases exit from the drum; and a propeller fan 22 disposed within cowl 10 to force air through the heater, part of it entering the combustion drum 12 through the burner shell 16, and part of it passing through the annular passage 14. More specific details of the structural arrangement of one direct fired portable heater of this general character may be found in Fahlberg U.S. patent application S.N. 169,717, filed January 30, 1962 and assigned to the same assignee as this application.

When the described direct-fired portable heater is operated alone, the combustion gases exiting from the combustion drum 12 through the peripheral gap 20 mix with the "clean" or uncontaminated ventilating air passing through the annular passage 14, and the combined mixture is discharged directly into the space to be heated. When it is desired to provide clean air to a space, the conversion apparatus shown at the right of FIGURE 1 is coupled to the heater so that operation of an indirect-fired character is obtained.

The parts of the conversion apparatus shown in FIGURE 1 include: a rectangular outer casing 24, open on the upstream left end and closed on the downstream right end; a cylindrical combustion drum extension section 26 projecting out of the inlet end of the conversion apparatus and adapted to be coupled to the outlet end of the combustion drum 12 after the diffuser 18 on the outlet end of the combustion drum has been removed; a clean air transfer plenum 28 into which the air from annular passage 14 is received and passed up to the inlet of the separate blower means of the conversion apparatus when the apparatus is coupled to the heater; a centrifugal fan 30 driven by motor 32 serving as the separate blower means for the conversion apparatus, the fan and motor assembly being mounted on top of the casing 24; a clean air outlet 34 on the side of the casing 24, with some of the tubes of the auxiliary heat exchanger 36 being visible through the outlet 34; a combustion gas outlet 38 to which a vent pipe is usually attached if the apparatus is operated indoors; and a supporting leg 40 for the conversion apparatus.

The structural arrangement of the conversion apparatus is shown in somewhat more detail in FIGURES 2 and 3. The auxiliary heat exchanger 36 is shown as a tube bundle supported at opposite ends by tube plates 42 and 44, each tube plate having apertures receiving the open-ended tubes. The periphery of the upstream tube plate 42 has a round-to-square baffle 46 therearound extending outwardly and in a downstream direction to seal against the inner surface of the casing so that the space surrounding the drum extension 26 is separated from the space surrounding the tube bundle. Thus an upstream chamber is formed at the inlet end of the conversion apparatus to receive the ventilating air from the heater. As the opposite or downstream end of the conversion apparatus, the tube plate 44 is spaced from the end wall 48 of the casing to form a downstream chamber or plenum 50 in communication with both the interior of the tubes and the stack 38.

The clean or ventilating air transfer plenum 28 essentially comprises a pair of inwardly-open, channel-shaped, vertical ducts 52, one on each side of the conversion apparatus, and each being in communication with the space surrounding the drum extension 26 and the annular passage 14. The upper end of each duct 52 is formed into an inwardly-directed elbow 54 terminating in an open end adjacent to the inlet 56 of the fan 30 so that the air discharged from the elbows will be drawn into the fan. It is noted that the fan inlet 56 is open to atmosphere except for that part of the inlet area covered by the outlet ends of the transfer plenum 28.

With the arrangement described, the general flow of combustion gases is shown by the broken line arrows in FIGURE 2 and the clean air flow is shown by the solid line arrows. The combustion gases pass from the heater combustion drum 12 into the extension section 26, then through the heat exchanger tubes in the intermediate section of the casing, into the combustion gases plenum 50, and then up through the stack 38. The clean air passes from annular passage 14 into the upstream space surrounding the drum extension 26, up through transfer plenum 28 and into fan 30, then down out of the fan along with additional ambient air drawn into the fan along with the air from the transfer plenum, past the tubes where heat exchange takes place, and through the outlet 34. The outlet 34 may have flexible ductwork connected thereto to direct the air to any desired location.

The means inducing a draft of combustion gases to compensate for the increased resistance to flow of the attached conversion apparatus is provided by an arrangement wherein part of the air discharged by the fan 30 is skimmed off and passed to a venturi in the stack 38.

To this end a take-off arrangement generally designated 58 is provided in the outlet portion of the fan to channel part of the fan discharge into duct 60 underlying the top wall 62 of the casing 24 and extending to the converging nozzle 64 which directs it into the throat of a venturi section 66 disposed in the stack 38. The high velocity discharge of the air from the nozzle into the venturi throat creates a velocity and pressure condition therein which induces a draft through the auxiliary heat exchanger tubes and combustion drum.

One form which the take-off arrangement 58 may take is shown in FIGURES 4 and 5 wherein a pair of plates 68 are spaced apart in parallel relation and have one vertical edge secured to the terminal portion of the fan scroll wall 70. An adjustable vane 72, the plates 68 and the wall 70 form an upwardly-open chamber having its bottom end open to the duct 60 which extends to the nozzle 64. The vane is preferably pivotally carried along its bottom edge by a pin 74 so that it can be adjusted to skim off the correct volume of air. The adjustment is carried out by moving the vane toward or away from the scroll wall 70 by rotating screw 76 to move it axially relative to the wall 70 through which it projects.

It will be appreciated that certain structural changes may be made within the scope of the invention. As illustrative examples, the disposition of the separate blower means relative to the casing may be changed, the positions of the clean air outlet 34 and the combustion gases outlet 38 may be changed, and the auxiliary heat exchanger 36 may take a different form.

The invention claimed is:
1. The combination of:
   (a) a direct-fired heater having first blower means forcing a first draft of air through both a combustion chamber and a separate ventilating air passage in heat exchanging relation with said combustion chamber; and,
   (b) apparatus adapted to be releasably coupled to said direct-fired heater for converting it to an indirect-fired heater, comprising;
   (c) a casing containing a heat exchanger connected to receive interiorly combustion gases from said combustion chamber and conduct said gases to an outlet;
   (d) second blower means including an inlet open to atmosphere creating a second draft of air separate from said first draft;
   (e) means directing a major part of said second draft of air and that part of said first draft existing from said ventilating air passage into said casing around said heat exchanger to a ventilating air outlet; and
   (f) means for discharging the remaining part of said second draft in a downstream direction into the flow of said combustion gases.
2. The combination of:
   (a) a direct-fired heater having a first blower means forcing air through both a central combustion chamber and an annular ventilating air passage surrounding said combustion chamber; and,
   (b) apparatus adapted to be releasably coupled to said direct-fired heater for converting it to an indirect-fired heater, comprising;
   (c) a casing connected to the outlet of said air heater;
   (d) means dividing said casing into an upstream chamber in communication with said annular passage, a downstream flue gas plenum, and an intermediate chamber including heat exchange tubes for conveying combustion gases from said combustion chamber to said flue gas plenum;
   (e) second blower means having an inlet in communication with said upstream chamber, and an outlet in communication with the space in said casing surrounding said heat exchange tubes; and,
   (f) means for directing a part of the air from said second blower means into the flow of said combus- tion gases to induce an increased velocity of said combustion gases.

3. The apparatus of claim 2 wherein said air directing means includes:
 (a) an air take-off chamber adjacent said second blower means outlet; and
 (b) means for regulating the air intake of said take-off chamber.

4. The apparatus of claim 2 including:
 (a) a flue gas stack in communication with said downstream plenum;
 (b) a venturi section in said stack; and,
 (c) nozzle means for directing said air from said take-off chamber into the throat of said venturi section.

5. The combination of:
 (a) a direct-fired air heater having first blower means forcing air through both a central combustion chamber and an annular ventilating air passage surrounding said central chamber; and,
 (b) apparatus adapted to be releasably coupled to said direct-fired heater for converting it to an indirect-fired heater, comprising;
 (c) a casing connected to the outlet of said air heater;
 (d) an auxiliary heat exchanger in said casing including heat exchanger tubes having inlet ends adapted for connection to said combustion chamber and outlet ends communicating with a combustion gas stack;
 (e) partition means in said casing blocking discharge of ventilating air from said heater ventilating air passage directly into the space in said casing surrounding said heat exchange tubes;
 (f) second blower means for forcing air through said casing and around said tubes;
 (g) duct means connecting the space in said casing upstream of said partition means to the inlet of said second blower means;
 (h) a venturi section in said combustion gas stack; and,
 (i) means for conveying a part of the air from said second blower means to said combustion gas stack and discharging it into said venturi section.

6. The combination of:
 (a) a direct-fired heater having first blower means forcing a first draft of air through both a combustion chamber and a separate ventilating air passage disposed in heat exchange relation with said combustion chamber; and,
 (b) apparatus adapted to be releasably coupled to said direct-fired heater for converting it to an indirect-fired heater, comprising;
 (c) a casing containing heat exchange tubes connected to convey combustion gases from said combustion chamber to a flue gas outlet;
 (d) second blower means including an inlet open to atmosphere for creating a second draft of air separate from said first draft;
 (e) means directing the major part of said second draft into said casing and around said heat exchanger tubes to an outlet;
 (f) means for directing the remaining part of said second draft in a downstream direction into the flow of said combustion gases; and
 (g) means for conducting that part of said first draft exiting from said ventilating air passage to the inlet of said second blower means.

References Cited in the file of this patent
UNITED STATES PATENTS

| | | |
|---|---|---|
| 943,832 | Kitchen | Dec. 21, 1909 |
| 1,991,449 | Cornelius | Feb. 19, 1935 |
| 2,001,953 | Blackmore | May 21, 1935 |
| 2,084,408 | Mueller | June 22, 1937 |
| 2,355,495 | Zier | Aug. 8, 1944 |
| 2,527,937 | Klug | Oct. 31, 1950 |
| 2,603,207 | Muhlenkort | July 15, 1952 |

FOREIGN PATENTS

| | | |
|---|---|---|
| 946,207 | France | Dec. 13, 1948 |